May 12, 1942.  J. D. SPALDING  2,282,617
ROTARY MACHINE
Original Filed March 1, 1937   2 Sheets-Sheet 2

Inventor
John D. Spalding
By Lyon & Lyon
Attorneys

Patented May 12, 1942

2,282,617

UNITED STATES PATENT OFFICE 2,282,617

ROTARY MACHINE

John D. Spalding, Los Angeles, Calif., assignor to The National Supply Company, Pittsburgh, Pa., a corporation of Pennsylvania Original application March 9, 1938, Serial No. 194,865, which is a division of application Serial No. 128,468, March 1, 1937. Divided and this application September 15, 1941, Serial No. 410,953

6 Claims. (Cl. 255—23)

This invention relates to rotary machines of the type used in the drilling of wells, and is more particularly related to a rotary machine of the enclosed type constructed to meet the present demands of deep drilling operations. This application is a division of my co-pending application Serial No. 194,865, filed March 9, 1938, for Rotary machine, patented October 14, 1941, No. 2,259,431, which application was in turn a division of a then co-pending application of John S. Morgan, Jr., and John D. Spalding, Serial No. 128,468, filed March 1, 1937, and patented June 18, 1940, No. 2,205,269.

An object of this invention is to provide a rotary machine wherein means are provided for maintaining proper alignment of the drill stem or kelly joint with relation to the table of the rotary machine so as to decrease the whipping and excessive vibration apt to develop in rotary machines of the present day design.

Another object of this invention is to provide a rotary machine wherein means are provided in operative combination with a rotary machine for rotatably guiding the kelly joint to decrease whipping and eliminate vibration to prolong the life of the rotary machine gears and bearings and drive bushing so that easier feeding of the drill stem is promoted.

Other objects and advantages of this invention it is believed will be apparent from the following detailed description of a preferred embodiment thereof as illustrated in the accompanying drawings.

Figure 1:
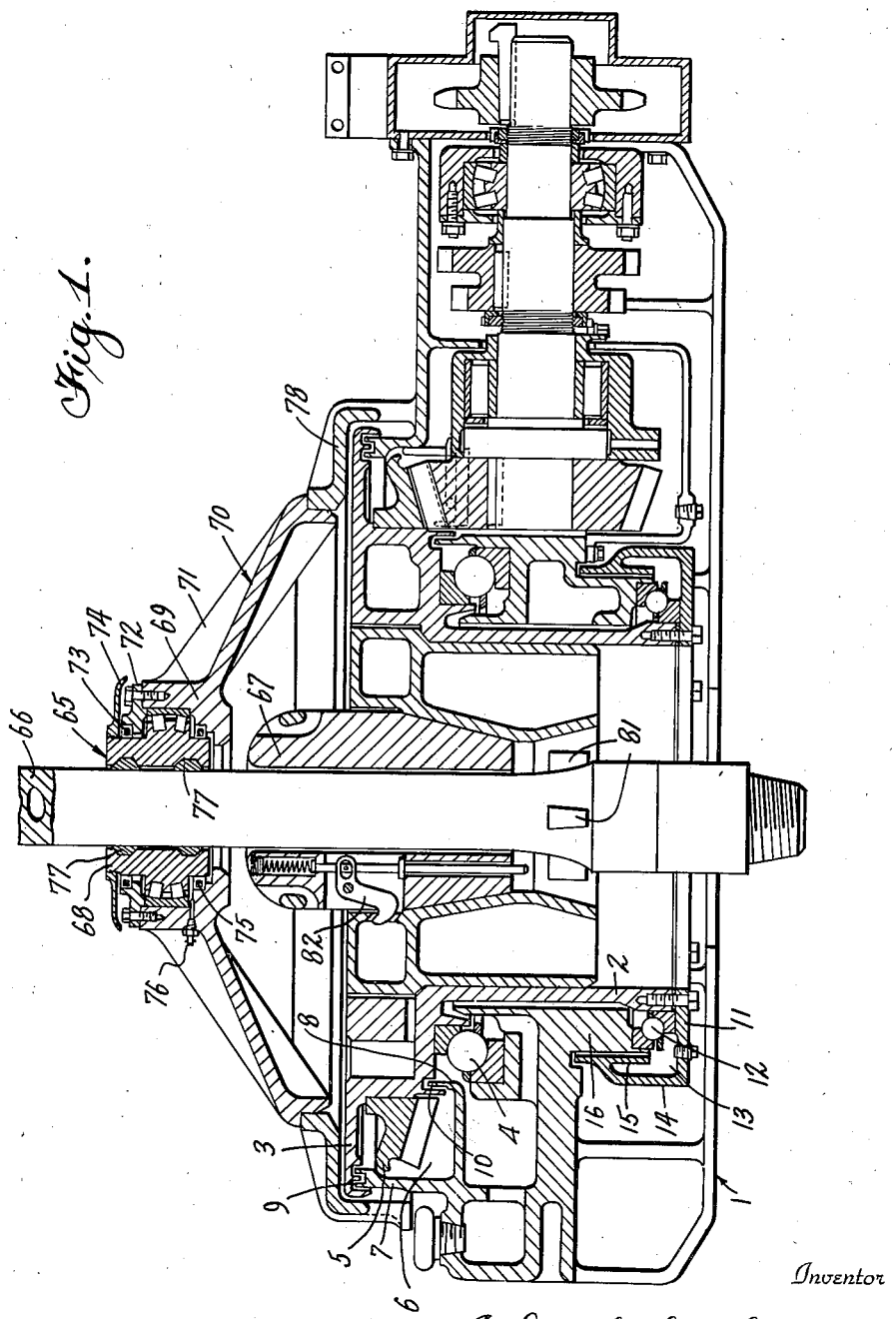
Figure 1 is a sectional elevation of the rotary machine embodying my invention.
Figure 2:
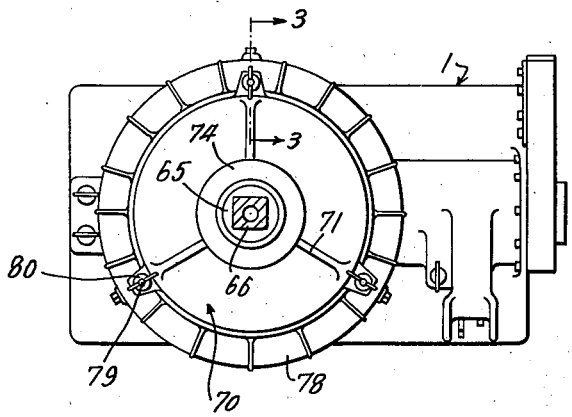
Figure 2 is a plan view thereof on a reduced scale.
Figure 3:
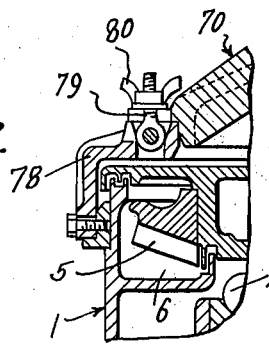
Figure 3 is a fragmental section view taken substantially on the line 3—3 of Figure 2.

In the rotary machine illustrated in Figures 1 to 3, inclusive, the base 1 has a central bore through which the annular skirt 2 of the rotary table 3 extends. An anti-friction bearing 4 supports the table 3 upon the base 1. A ring gear 5 is carried by the table 3 which operates within the annular enclosure 6 formed by the upstanding rim 7 of the base 1 and an inner annular rim 8 likewise formed on the base 1.

The top of the chamber 6 is closed by the table which forms a labyrinth seal 9 with the rim 7 and a labyrinth seal 10 with the rim 8 so as to exclude foreign matter from, and retain lubricant, within the annular chamber. The labyrinth seals 9 and 10 may be of any suitable or desirable types such, for example, as illustrated in Patent No. 2,008,774 to John D. Spalding.

An upthrust ring 11 is removably secured to the lower end of the annular skirt 2 and supports the anti-friction upthrust bearing 12 which is thus maintained in the annular chamber 13 formed between the ring 11 and the annular skirt 2. Bearings 4 and 12 cooperate to maintain the rotary table in alignment upon the base 1 to hold the table to strictly concentric rotation with relation to the base 1. On the upthrust ring 11 is formed an outer annular wall 14 which surrounds the bearing 12. Spaced inwardly from the wall 14 and supported thereon is a skirt 15 adapted to form a lubricant seal with the cylindrical portion 16 of the base 1.

In the rotary machine embodying my invention in order to maintain the operating parts of the machine in proper alignment, particularly where the machine is utilized under deep drilling conditions, I have provided a centering bearing 65 for the kelly 66. As is well known to those skilled in the art of rotary drilling, the upper end of the kelly is supported by a tackle block (not shown) and the lower end is fastened to the drill pipe (not shown).

In ordinary rotary machines, the only radial bearings or centering means for the kelly is the same means that is used to rotate it, i. e., the drive bushings 67. This practice has resulted in excessive wear of the drive bushing 67 and of the bearings 4 and 12 which support and maintain alignment of the drive bushing 67. As wear occurs, the wear becomes more acute due to the whipping action of the kelly 66.

In accordance with my invention, and in order to insure that the rotary machine thereof will operate smoothly without whipping action, I have provided a centering bearing assembly including the centering bearing 65 which serves to hold the kelly 66 in proper vertical alignment so that the drive bushings 67 are required to perform only one function, i. e., of rotating the kelly 66.

In accordance with my invention, a sleeve 68, provided with a bore of the same configuration as the cross-section of the kelly 66, is mounted in a suitable housing 69 which is supported on a frusto-conical structure 70. The structure 70 is reinforced by radial extending ribs 71. A closure flange 72 is secured to the housing 69 and carries a packing ring 73, which, in cooperation with the mud thrower flange 74 secured to the sleeve 68, prevents the admission of mud or other foreign matter to the centering bearing 65. A second packing ring 75 is positioned in the lower part of the housing 69. The two packing rings, 73 and 75, likewise serve to prevent escape of lubricant supplied the bearing 65 through a fitting 76. Drive cushions 77, composed of rubber or like resilient material, may be inserted in the sleeve 68. The bearing housing 69, supporting structure 70, and ribs 71, are preferably of integral construction for the purpose of rigidity.

A ring 78 is secured to the base 1 of the rotary machine and supports the entire kelly centering assembly. Any preferred form of quick connection may be provided between the structure 70 and the supporting ring 78 in order that the assembly may be readily installed and withdrawn from position.

In the construction as illustrated, pivot bolts 79 and wing nuts 80 cooperate to removably secure said parts together. This demountable feature is necessary in order that the centering assembly may be maintained upon the kelly 66 when the latter is withdrawn from the rotary machine.

Withdrawal of the kelly upwardly through the rotary machine is a necessary operation preliminary to adding or removing a joint of the drill pipe. When this operation is accomplished, it is desirable to have the drive bushings 67, as well as the centering assembly, remain upon the kelly. With this purpose in view, a projection, or series of projections, 81, are secured to the lower end of the kelly 66 in any convenient manner. Upon withdrawal of the kelly 66, one of the projections 81 is adapted to release a latch mechanism 82 contained within the drive bushing 67. The projections 81 then support the entire weight of the centering assembly and the drive bushing 67, which parts may then be removed with the kelly from the rotary machine.

Figure 4:
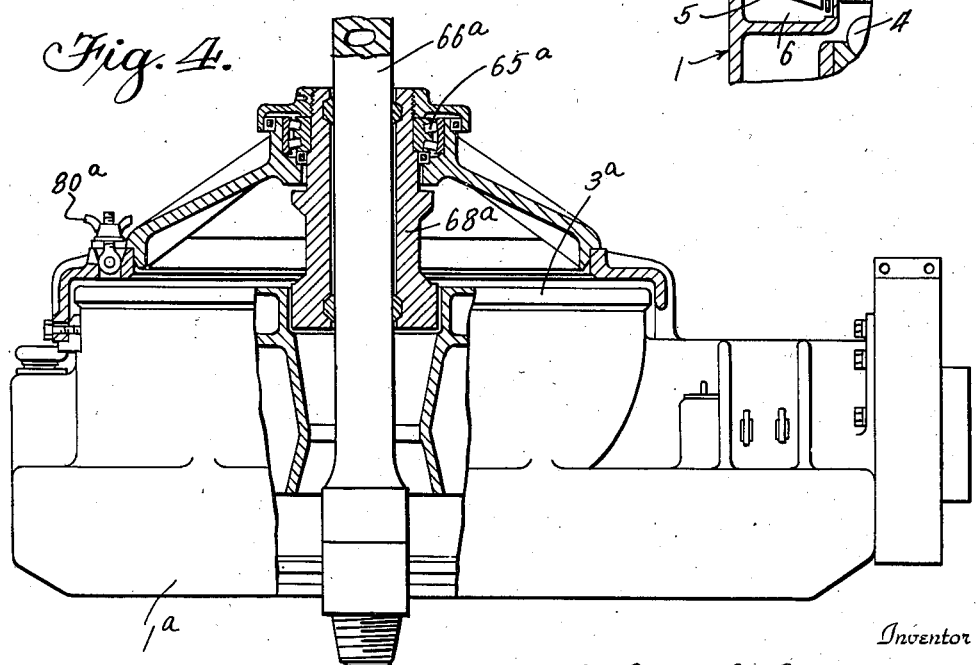
Figure 4 is a side elevation partly in vertical section illustrating a modified form of drive bushing and steadyrest.

In the modified form of my invention illustrated in Figure 4, there is illustrated a modification of the centering bearing assembly for the kelly in which the bearing sleeve and the drive bushings are formed integrally as a member 68ª which is suspended from the self-aligning bearings 65ª. The lower end of the member 68ª extends into a polygonal opening provided in the table 3ª and fits into driving engagement therewith. In this construction the aligning means for the kelly 66ª is supported entirely by the base 1ª and the sole function of the table 3ª is to rotate the member 68ª and hence the kelly 66ª. Release of the wing nuts 80ª permits the withdrawal of the kelly 66ª with the centering bearing assembly carried thereon.

Having fully described my invention, it is to be understood that I do not wish to be limited to the details herein set forth, but my invention is of the full scope of the appended claims.

I claim:

1. A rotary machine for rotating a drill stem, having a base, a table rotatably mounted on the base, said drill stem being provided with an abutment, in combination with a drill stem drive member having a non-rotative connection with the table, lock means to lock said member against upward movement relative to said table, and means adapted to cooperate with said lock means and the abutment provided on the drill stem to release said lock means incidental to the withdrawal of the drill stem from the table.

2. In a device of the class described, the combination with a drill stem of a rotary machine having a base, a table rotatably mounted on the base, a drive member slidably but non-rotatably mounted relative to said drill stem and having a non-circular engagement with said table, whereby said table may impart rotation to the drill stem through said drive member, lock means carried on said drive member adapted to engage an element on said table to lock said drive member against displacement from said table, and means associated with the drill stem and adapted to release said lock means upon movement of the drill stem to a predetermined position relative to said drive member.

3. In a device of the class described, the combination with a drill stem of a rotary machine having a base, a table rotatably mounted on the base, a drive member slidably but non-rotatably mounted relative to said drill stem and having a non-circular engagement with said table, whereby said table may impart rotation to the drill stem through said drive member, lock means carried on said drive member and adapted to lock said drive member against displacement from said table, said lock means including a pivoted latch adapted to engage an element on said table, an abutment on one end of said drill stem adapted to cooperate with the lock means to automatically release said latch upon withdrawal of the drill stem from the table.

4. In a device of the class described, the combination with a drill stem of a rotary machine having a base, a table rotatably mounted on the base, a drive member slidably but non-rotatably mounted relative to said drill stem and having a non-circular engagement with said table, whereby said table may impart rotation to the drill stem through said drive member, lock means adapted to lock said drive member against displacement from said table, and means associated with the drill stem and adapted to release said lock means upon movement of the drill stem to a predetermined position relative to said drive member.

5. A drill stem drive apparatus comprising in combination a rotary machine having a table rotatably mounted on a stationary base, drive means carried by the base and adapted to rotate said table, the table having a central opening through which the drill stem extends, a drive member removably supported by the table within said opening and adapted to contact the drill stem to form a driving connection between the table and the drill stem, a centering member operatively associated with said drive member and adapted to contact the drill stem and rotate therewith, said centering member acting as a guide to hold the drill stem in proper driving alignment, and the drill stem being freely reciprocable through both of said members.

6. In an apparatus of the class described for rotating a drill stem, the combination including a rotary machine having a table rotatably mounted on a stationary base, driving means carried on the base adapted to rotate said table, the table having a central opening through which the drill stem extends, a centering member adapted to contact the drill stem and rotate therewith without transmitting torque, said centering member acting as a guide to hold the drill stem centrally of said opening, drive means including a drive member detachably associated with said table, said drive means being adapted to be driven by said table and to transmit torque from the rotary machine to the drill stem, and the drill stem being free to reciprocate through both of said members.

JOHN D. SPALDING.